(12) United States Patent
Franceschini et al.

(10) Patent No.: US 8,270,345 B2
(45) Date of Patent: Sep. 18, 2012

(54) METHOD AND SYSTEM FOR TRANSMITTING CONTENT TO A PLURALITY OF USERS OF A MOBILE COMMUNICATION NETWORK

(75) Inventors: Daniele Franceschini, Turin (IT); Claudio Guerrini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1008 days.

(21) Appl. No.: 12/085,597

(22) PCT Filed: Nov. 28, 2005

(86) PCT No.: PCT/EP2005/012682
§ 371 (c)(1),
(2), (4) Date: Aug. 21, 2008

(87) PCT Pub. No.: WO2007/059791
PCT Pub. Date: May 31, 2007

(65) Prior Publication Data
US 2009/0168683 A1    Jul. 2, 2009

(51) Int. Cl.
*H04W 4/00*    (2009.01)
(52) U.S. Cl. ........ 370/328; 370/329; 370/311; 370/312; 370/318; 455/434; 455/450; 455/574
(58) Field of Classification Search ............... 455/434, 455/450, 574, 343.2, 343.3, 343.4; 370/328, 370/329, 395.52, 352–356
See application file for complete search history.

(56) References Cited

U.S. PATENT DOCUMENTS

| | | | |
|---|---|---|---|
| 6,178,447 B1 * | 1/2001 | Wannenmacher et al. ... | 709/219 |
| 2003/0016702 A1 * | 1/2003 | Bender et al. ................ | 370/522 |
| 2003/0035403 A1 | 2/2003 | Choi et al. | |
| 2003/0147371 A1 * | 8/2003 | Choi et al. .................... | 370/341 |
| 2004/0097253 A1 * | 5/2004 | Malkamaki ................... | 455/522 |
| 2004/0196870 A1 * | 10/2004 | Cheng et al. ................. | 370/470 |
| 2006/0030342 A1 * | 2/2006 | Hwang et al. ................ | 455/466 |
| 2006/0171342 A1 * | 8/2006 | Dateki .......................... | 370/311 |
| 2007/0091853 A1 * | 4/2007 | Carlsson et al. ............. | 370/335 |
| 2008/0043657 A1 * | 2/2008 | Ishii et al. ..................... | 370/311 |
| 2010/0214966 A1 * | 8/2010 | Hu et al. ....................... | 370/311 |

OTHER PUBLICATIONS

"3rd Generation Partnership Project; Technical Specification Group Radio Access Network; High Speed Downlink Packet Access (HSDPA)," 3GPP TS 25.308, v6.3.0, Release 6, pp. 1-28, XP014027651, (Dec. 2004).

(Continued)

*Primary Examiner* — Kathy Wang-Hurst
(74) *Attorney, Agent, or Firm* — Finnegan, Henderson, Farabow, Garrett & Dunner, L.L.P.

(57) ABSTRACT

A scheme substantially similar to that used in HSDPA (in which a downlink channel is provided for data transmission, and at least one associated control channel is provided for transmission of control information including information related to availability of a portion of the transmitted data for the current UE on the downlink channel) is adapted for prolonged high data rate transmission, particularly for MBMS transmission. A duration of the data portions sent on the downlink channel is varied possibly up to high duration values (as compared with a duration of one TTI). User equipment enjoying the service is informed of the duration of the imminent available data portion in a field suitably defined and transmitted as control information on the associated control channel(s). Advantageously, during the "long" decoding of the data portion, the UE does not monitor the associated control channel(s), so that the impact on the terminal's battery is considerably reduced.

22 Claims, 4 Drawing Sheets

OTHER PUBLICATIONS

"Universal Mobile Telecommunications System (UMTS); Introduction of the Multimedia Broadcast/Multicast Service (MBMS) in the Radio Access Network (RAN)," ETSI TS 125 346, v6.6.0, 3GPP TS 25.346, version 6.6.0, Release 6, pp. 1-60, XP014031939, (Sep. 2005).

"Universal Mobile Telecommunications System (UMTS); Multimedia Broadcast/Multicast Service (MBMS); Architecture and Functional Description," ETSI TS 123 246, v6.8.0, 3GPP TS 23.246, version 6.8.0, Release 6, pp. 1-49, XP014031874, (Sep. 2005).

"$3^{rd}$ Generation Partnership Project; Technical specification Group Radio Access Network; Ultra High Speed Downlink Packet Access," 3GPP TR 25.950, v4.0.1, Release 4, pp. 1-27, (Jul. 2005).

* cited by examiner

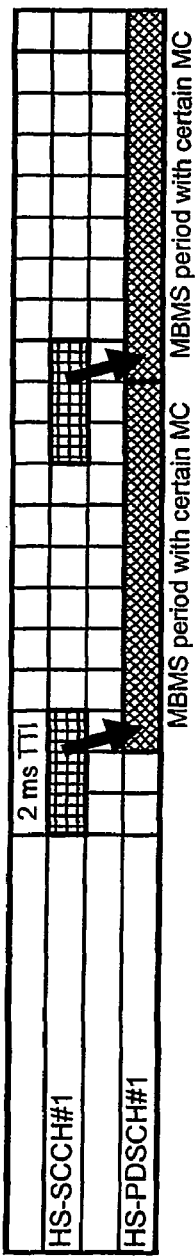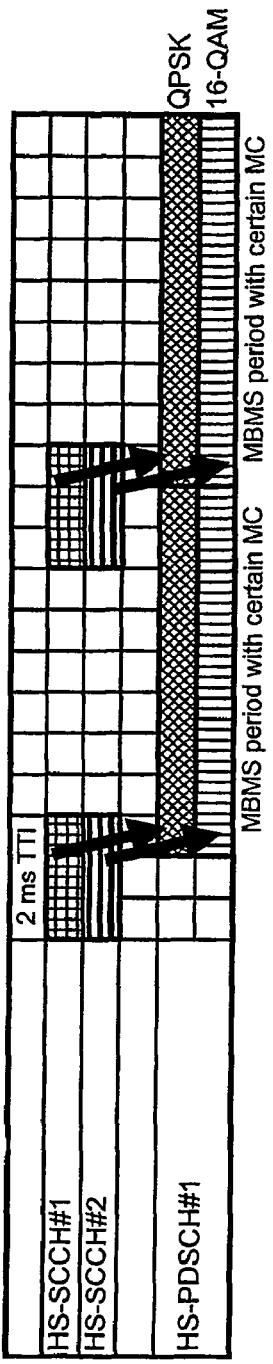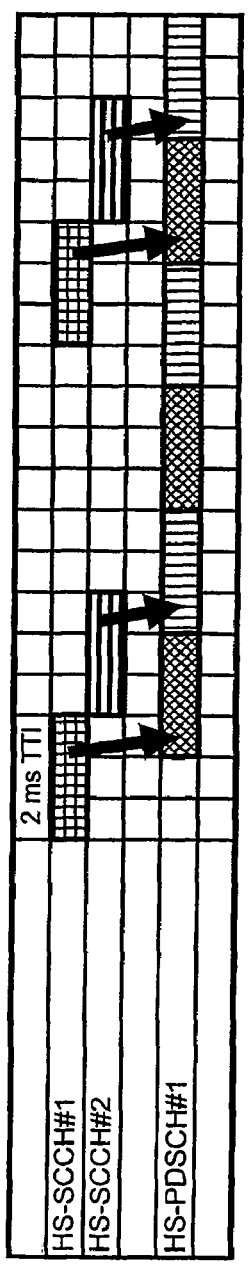

METHOD AND SYSTEM FOR TRANSMITTING CONTENT TO A PLURALITY OF USERS OF A MOBILE COMMUNICATION NETWORK

CROSS REFERENCE TO RELATED APPLICATION

This application is a national phase application based on PCT/EP2005/012682, filed Nov. 28, 2005.

TECHNICAL FIELD OF THE INVENTION

The present invention generally relates to the field of mobile, radio communications, and particularly to the transmission of information content, in particular multimedia content, to users of mobile telephony networks. The present invention can be applied in mobile networks using a packet switched radio interface based on a packet channel managed by means of a dynamic adaptation of the transmission as a function of the radio quality perceived by the receiver, following the changes of the channel; this mechanism is usually addressed as Link Adaptation, (LA) or AMC (Adaptive modulation and coding) and Hybrid Automatic Retransmission reQuest (H-ARQ). Moreover, the present invention can be applied to whatever radio access interface, e.g. CDMA, OFDM, TDMA based network, in which packet transmission is provided with a packet channel shared by different users and controlled by means of AMC, H-ARQ and packet scheduling algorithms, such as for example third or fourth generation (shortly, "3G", "4G") mobile telephony networks. More particularly, the invention relates to multimedia content multicasting/broadcasting in 3G-4G networks.

BACKGROUND OF THE INVENTION

Mobile telephony networks (Public Land Mobile Networks, shortly PLMNs) were initially conceived for enabling voice communications, similarly to the wired networks (Public Switched Telephone Networks, PSTNs), but between mobile users. Mobile telephony networks have experienced an enormous spread, especially after the introduction of second-generation mobile cellular networks, and particularly digital mobile cellular networks such as those complying with the Global System for Mobile communications (GSM) standard (and its United States and Japanese corresponding systems). The services offered by these cellular networks in addition to plain voice communications have rapidly increased in number and quality; just to cite a few examples, Short Message Service (SMS) and Multimedia Message Service (MMS) services, and Internet connectivity services have been made available in the last few years.

More recently, 3G mobile communication systems, like those complying to the Universal Mobile Telecommunications System (UMTS), are being deployed, bringing about significantly higher information exchange rates, allowing network operators to offer new services to the mobile users. Moreover new technologies were introduced on the existing 3G standard, such as HSDPA (High Speed Downlink Packet Access) and HSUPA (High Speed Uplink Packet Access), in order to accomplish the evolution of new services in terms of throughput made available on the radio interface (up to 14.4 Mbps on the downlink and 5 Mbps on the uplink) and reduced latency. The evolution towards 4G foresees the so called "LTE" (Long Term Evolution) architecture that introduces a completely new radio architecture able to support bit rate up to 100 Mbps connected to a new "All IP based" Core Network architecture, with further reduced latency and mobility managed by IP based protocols.

PLMNs are born as Circuit-Switched (CS) networks and, as such, are more suitable for voice communications than for exchanging relatively large amounts of data. Data communications are better achieved by adopting Packet-Switched (PS) schemes, like in computer networks, particularly the Internet. This remains true also for 3G mobile communications systems, despite their increased communications rate capabilities. The PS domain of the UMTS is constituted by a core network, which is the evolution of the second generation General Packet Radio Service (GPRS) core network, and a radio access network known as the UTRAN (UMTS Terrestrial Radio Access Network). The UTRAN complying with the 1999 release of the standard (so-called "R99") is able to support PS transmission up to 384 Kbps for the support of person-to-person or content/network-to-person communications, by means of dedicated channel over a radio link.

Usually, in PLMNs, even if provided with a UTRAN infrastructure, the information content is transferred in a Point-To-Point (P-T-P) or unicast mode, upon activation of a session between a User Equipment (UE) and a service provider connected to a packet-switched network, e.g. a server connected to the core network or to the Internet; the activation of such a session involves the setting up of logical and physical connections between the server and the UE. In such a P-T-P communication mode, the radio resources to be allocated for the exchange of data between the network and the UEs depend on the number of different mobile stations simultaneously exploiting the services, even if two or more users take advantage of the same information content at the same time. This limits the possibility of simultaneously accessing available services by several users, unless the radio resources are oversized.

Thus, it is desirable to have the possibility of delivering information contents related to a same service exploitable by two or more users at a time based on a different, Point-To-Multipoint (P-T-M) or multicast/broadcast mode, so as to save the amount of allocated radio resources.

In this respect, the 3GPP (3rd Generation Partnership Project) standardization group is discussing the implementation, both in the GERAN (GSM/EDGE Radio Access Network, wherein EDGE stays for Enhanced Data for GSM Evolution) and in the UTRAN (UMTS Terrestrial Radio Access Network) frameworks, of a new kind of service architecture, named MBMS (Multimedia Broadcast/Multicast Service). Basically, the MBMS targets the simultaneous distribution of information content (particularly, multimedia content) to more than one mobile user from a single serving base station over a common radio resource; this is for instance the case of short clips of sport matches delivered to UEs of mobile users, or of a television channel transmission through the mobile network. In other words, PLMN operators experience the need of proper mechanisms in the network in order to efficiently transport simultaneously the same information content to specified groups of users.

A technique being currently considered for high data rate transmission is HSDPA (High-Speed Downlink Packet Access), which is considered as a "3.5G" system, offering peak data rates up to 10-14 Mb/s, and is expected to be implemented in the next few years. HSDPA is described, inter alia, in technical reports TR 25.308 (e.g. TR 25.308 V.6.3.0) and TR 25.950 (e.g. TR 25.950 V.4.0.1). In general, HSDPA (High-Speed Downlink Packet Access) refers to a data transmission technique for handling a High-Speed Downlink Shared CHannel (HS-DSCH), i.e., a downlink data channel shared between a plurality of users—supporting high-speed downlink packet data transmission—and its associated control channel, in an UMTS communication system. The performance of HSDPA is mainly based on a number of mechanisms that lead to low latency times and high throughput, such as AMC (Adaptive Modulation and Coding), HARQ (Hybrid Automatic Retransmission reQuest), Fast Packet Scheduling.

AMC (Adaptive Modulation and Coding)

In cellular communication systems, the quality of a signal received by a UE depends on number of factors, such as the distance between the desired and interfering base stations, path loss exponent, log-normal shadowing, short term Rayleigh fading and noise. In order to improve system capacity, peak data rate and coverage reliability, the signal transmitted to and by a particular user is modified to account for the signal quality variation through a process commonly referred to as link adaptation. Traditionally, CDMA systems have used fast power control as the preferred method to control the variations of the propagation channel. Adaptive Modulation and Coding (AMC) offers an alternative link adaptation method that promises to raise the overall system capacity. AMC provides the flexibility to match the modulation-coding scheme to the average channel conditions for each user. With AMC, the power of the transmitted signal is held constant over a frame interval, and the modulation and coding format is changed to match the current received signal quality or channel conditions. In a system with AMC, users close to the base station (BTS, or node-B) are typically assigned higher order modulation with higher code rates (e.g. 16 Quadrature Amplitude Modulation, or QAM, with R=¾ turbo codes), but the modulation-order and/or code rate will decrease as the distance from BTS/node-B increases. Generally, each combination of the modulation technique and of the coding technique is called a "MCS (Modulation and Coding Scheme)": a plurality of MCS levels has been defined, according to the number of combinations of the modulation techniques and the coding techniques.

H-ARQ (Hybrid Automatic Repeat reQuest)

H-ARQ can be seen as an implicit link adaptation technique. Whereas in AMC explicit C/I (ratio between useful signal power and noise including interference) measurements or similar measurements are used to set the modulation and coding format, in H-ARQ link layer acknowledgements are used for re-transmission decisions. There are many schemes for implementing H-ARQ, such as Chase Combining (CC) and Incremental Redundancy (IR).

CC (also called H-ARQ-type-III with one redundancy version) involves the retransmission by the transmitter of the same coded data packet. The decoder at the receiver combines these multiple copies of the transmitted packet weighted by the received SNR. Diversity (time) gain is thus obtained. In the H-ARQ-type-III with multiple redundancy versions different puncture bits are used in each retransmission.

IR (or H-ARQ-type-II) is an implementation of the H-ARQ technique wherein instead of sending simple repeats of the entire coded packet, additional redundant information is incrementally transmitted if the decoding fails on the first attempt.

Combining AMC with H-ARQ leads to the best of both worlds: AMC provides the coarse data rate selection, while H-ARQ provides for fine data rate adjustment based on channel conditions.

In order to limit the complexity of the retransmission process, a stop-and-wait (SAW) scheme has been chosen by the 3GPP for implementing the H-ARQ. SAW H-ARQ increases channel utilization efficiency by continuously transmitting a plurality of data packets before receiving an acknowledge (ACK) for the previous packet data. If n logical channels are established between a UE and a Node B, each identified by time or channel number, while one channel is awaiting an ACK o NACK (Negative ACK) the other (n−1) channels continue to transmit.

Fast Packet Scheduling

Examples of schedulers proposed for HSDPA include Round Robin (RR) and Maximum C/I.

The RR scheduler operates by scheduling users based upon their position in a First-In-First-Out (FIFO) queue. Although it provides the least complex operation and the most fairness between users, the UEs channel conditions are not taken into consideration. As a result, users may be scheduled when experiencing a destructive fade, causing the packet to be corrupted.

As an alternative, the Maximum C/I algorithm schedules users when their instantaneous Signal over Interference Ratio (SIR) is the highest amongst all users at the respective base station. This scheduling algorithm ensures that all users are served on a constructive fade, and as a result, has a higher percentage of successful transmissions. Furthermore, the throughput and spectral efficiency is maximized because the highest possible MCS level is used during each transmission. The disadvantage, however, is the lack of fairness between users in the sector.

With regards to the HS-DSCH transport channel, two architectures have been considered by the 3GPP as part of the study item: an RNC (Radio Network Controller)-based architecture consistent with R99 architecture and a Node B-based architecture for scheduling. Moving the scheduling to the Node B enables a more efficient implementation of scheduling by allowing the scheduler to work with the most recent channel information. The scheduler can adapt the modulation to better match the current channel conditions and fading environment. Moreover, the scheduler can implement algorithms in order to exploit the multi-user diversity by scheduling only those users in constructive fades. Thus, it was decided to directly terminate the HS-DSCH channel at the Node B. In particular, the new functionalities of H-ARQ and HS-DSCH scheduling are included in the MAC (Medium Access Control) layer: in the UTRAN, these functions are included in a new entity called MAC-hs located in Node B.

The basic downlink HS-DSCH channel configuration consists of one or several HS-PDSCHs (High Speed Physical Downlink Shared CHannel), combined with a number of separate Shared physical Control CHannels, HS-SCCHs. The set of shared physical control channels allocated to the UE at a given time is called an HS-SCCH set. According to TR 25.308, the number of HS-SCCHs in a HS-SCCH set as seen from the UE's point-of-view can range from a minimum of one HS-SCCH to a maximum of four HS-SCCHs. The UE shall monitor continuously all the HS-SCCHs in the allocated set.

HS-SCCH is used to inform the users on when they are to be served, as well as in order to provide them with information needed for the decoding process, on HS-PDSCH. There is a fixed time offset between the start of the HS-SCCH information and the start of the corresponding HS-PDSCH sub-frame. For each HS-DSCH TTI (Transmission Time Interval), each HS-SCCH carries HS-DSCH-related downlink signaling for one UE. The following information is carried on the HS-SCCH:

Transport Format and Resource Indicator (TFRI), carrying information about the dynamic part of the HS-DSCH transport format, including transport block set size and modulation scheme. The TFRI also includes information about the set of physical channels (channelisation codes) onto which HS-DSCH is mapped in the corresponding HS-DSCH TTI.

H-ARQ-related Information (H-ARQ information), including the H-ARQ protocol related information for the corresponding HS-DSCH TTI and information about the retransmission/redundancy version.

Furthermore, the HS-SCCH carries a UE identity (UE Id Mask, or simply UE, ID) that identifies the UE for which it is carrying the information necessary for decoding the HS-PD-SCH.

In particular, the first part of the HS-SCCH contains the channelisation code set and the modulation scheme for the HS-DSCH allocation, whereas the second part containing the transport block size and H-ARQ related information. Even more particularly, HS-SCCH is organized so that each TTI is subdivided in subframes of three timeslots, having the same length of the HS-DSCH subframes: the first part of the HS-SCCH information (CS and channelisation code set) is sent on the first timeslot, whereas the second part of the HS-SCCH information transport block size and H-ARQ information) is sent on the third timeslot.

US patent application no. 2003/0035403A1 tackles the problem of providing a method for transmitting information shared by all UEs supporting the same HSDPA service so that the UEs can receive the information at the same time, in an HSDPA communication system. According to US 2003/0035403A1, such problem is solved by a method comprising the steps of: upon generation of the common information, transmitting control information including common ID information indicating the common information over a shared control channel (SHCCH); and transmitting the common information over the SHCCH in a TTI (Transmission Time Interval) equal to or after a TTI where the control information is transmitted.

SUMMARY OF THE INVENTION

The Applicant tackled the problem of managing prolonged (e.g. several minutes or even some hours) transmission of high data rate content (e.g. multimedia content transmission) in a mobile network, particularly a mobile telephony network. An exemplary prolonged high data rate transmission service could be the transmission of one or more television channels through the mobile network, which, inter alia, could be enjoyed by a plurality of users at the same time.

The Applicant has perceived that while HSDPA could be used to support the high data rate transmission, at the same time the current provisions for enjoying a HSPDA service could hardly be applied for prolonged transmission, due to the provision for a HSDPA compliant UE of continuously accessing HS-SCCH for deriving possible control information for decoding the transmitted data. The continuous access has a strong impact on the UE battery, and in particular a continuous access to HS-SCCH for prolonged time could lead the UE to an undesirable fast battery discharge.

The Applicant has found that a scheme substantially similar to that used in HSDPA (i.e., a scheme in which a downlink channel is provided for data transmission, and at least one associated control channel is provided for transmission of control information including information related to availability of a portion of the transmitted data for the current UE on the downlink channel) could be adapted for prolonged high data rate transmission, provided that a duration of the data portions sent on the downlink channel could be varied possibly up to high duration values (as compared with a duration of one TTI). UEs enjoying the service are informed of the duration of the imminent available data portion in a field suitably defined and transmitted as control information on the associated control channel(s). Advantageously, during the "long" decoding of the data portion the UE does not monitor the associated control channel(s), so that the impact on the terminal's battery can be considerably reduced.

In particular, according to the Applicant, it could be convenient to apply in HSDPA the scheme described in the previous paragraph for a p-t-m transmission, and to leave unchanged the current scheme of HSDPA in case of p-t-p transmission.

In a first aspect, the invention relates to a method of transmitting information content to at least one user of a mobile communications network, the at least one user being equipped with a respective user equipment. The method comprises:

providing at least one downlink channel for transmission of said information content;

associating at least one control channel to said at least one downlink channel;

transmitting first control information on said at least one control channel, said first control information being adapted to inform the at least one user equipment of an availability of a portion of said information content on said downlink channel;

transmitting second control information on said at least one control channel, said second control information comprising a timing parameter being adapted to inform said at least one user equipment about a duration of at least said portion of information content;

transmitting said portion of information content on said at least one downlink channel.

Preferably, said at least one user comprises a plurality of users, each of which is equipped with respective user equipment, and wherein said downlink channel is adapted for being shared among the plurality of user equipment.

Preferably, said at least one control channel is adapted for being shared among the plurality of user equipment.

Preferably, the transmission of information content on said at least one downlink channel is scheduled according to a prefixed time interval.

Preferably, the transmission of control information on said at least one control channel is scheduled according to said prefixed time interval.

Preferably, the transmitting of said first control information occurs during a first time interval, and said first control information is adapted to inform said at least one user equipment that the availability of said portion of information content on said at least one downlink will start in a second time interval, the second time interval beginning subsequently to a beginning of the first time interval.

Preferably, said first and said second time intervals are partially overlapping with each other.

Preferably, said at least one user equipment is adapted to stop monitoring of said control channel during transmission of said portion of information content on said downlink channel, and to restart monitoring of said control channel at the end of said transmission of said portion of information content, based on said timing parameter.

Preferably, said timing parameter is a multiple of said prefixed time interval.

Preferably, said method further comprises associating a content identifier with said information content.

Preferably, said first control information further comprises said content identifier.

Preferably, said content identifier is transmitted to said plurality of user equipment.

Preferably, said content identifier belongs to a list of predefined content identifiers.

Preferably, the method further comprises conditioning the inclusion of said timing parameter in said second control information to the belonging of said content identifier to said list.

Preferably, said timing parameter is included in said second control information by exploiting at least a first part of predefined fields, said predefined fields being adapted to store information related to retransmission of information content portions.

Preferably, said second control information further comprises a retransmission activation information, said retransmission activation information being stored in a second part of said predefined fields, and wherein the method further comprises conditioning the inclusion of said timing parameter in said second control information to a first value of said retransmission activation information.

Preferably, the method further comprises receiving at least one feedback related to a reception quality of said downlink channel from the at least one user equipment.

Preferably, the method further comprises:
based on said at least one feedback, setting to a second value said retransmission activation information;
substituting said timing parameter in said second control information with information related to a retransmission of said portion of information content; and
retransmitting at least once said portion of information content on said at least one downlink channel.

Preferably, the method further comprises, conditioned to said second value of said retransmission activation information:
scheduling transmission on said at least one control channel of control information related to transmission of a further portion of information content on said downlink channel according to said timing parameter;
setting a duration of said further portion of information content equal to said timing parameter; and
transmitting said further portion of information content on said downlink channel.

In a second aspect, the invention relates to a mobile communications network comprising an access network sub-system (e.g., a UTRAN) being configured for performing the method of the first aspect.

In a third aspect, the invention relates to a method of receiving information content at a user equipment of a user of a mobile communications network. The method comprises:
monitoring at least one control channel associated to a downlink channel, the downlink channel being provided for transmission of said information content, the at least one control channel being provided for transmission of control information adapted for allowing decoding of the information content transmitted on said downlink channel;
receiving first control information on said at least one control channel, said first control information being adapted to inform the user equipment of an availability of a portion of said information content on said downlink channel;
receiving second control information on said at least one control channel, said second control information comprising a timing parameter being adapted to inform said user equipment about a duration of at least said portion of information content;
decoding said portion of information content on said at least one downlink channel, by accessing said downlink channel based on said first control information for a duration equal to said timing parameter.

Preferably, said downlink channel is adapted for being shared among a plurality of user equipment.

Preferably, said at least one control channel is adapted for being shared among the plurality of user equipment.

Preferably, the transmission of the information content on said downlink channel is scheduled according to a prefixed time interval.

Preferably, the transmission of the control information on said at least one control channel is scheduled according to said prefixed time interval.

Preferably, the transmission of said first control information occurs during a first time interval, and said first control information is adapted to inform said user equipment that the availability of said portion of information content on said downlink channel will start in a second time interval, the second time interval beginning subsequently to a beginning of the first time interval.

Preferably, said first and said second time intervals are partially overlapping with each other.

Preferably, said method further comprises stopping monitoring of said control channel during transmission of said portion of information content on said downlink channel, and restarting monitoring of said control channel at the end of said transmission of said portion of information content, based on said timing parameter.

Preferably, said timing parameter is a multiple of said prefixed time interval.

Preferably, a content identifier is associated to said information content.

Preferably, said first control information further comprises said content identifier.

Preferably, said content identifier belongs to a list of predefined content identifiers.

Preferably, the method further comprises conditioning the accessing of said downlink channel for a duration equal to said timing parameter to the belonging of said content identifier to said list.

Preferably, said timing parameter is included in said second control information by exploiting at least a first part of predefined fields, said predefined fields being adapted to store information related to retransmission of information content portions.

Preferably, said second control information further comprises a retransmission activation information, said retransmission activation information being stored in a second part of said predefined fields, and wherein the method further comprises conditioning the accessing of said downlink channel for a duration equal to said timing parameter to a first value of said retransmission activation information.

Preferably, the method further comprises sending at least one feedback related to a reception quality of said downlink channel.

Preferably, the method further comprises, conditioned to a second value of said retransmission activation information:
receiving on said at least one control channel control information related to transmission of a further portion of information content on said downlink channel, the transmission being scheduled according to said timing parameter; and
receiving said further portion of information content on said downlink channel for a duration equal to said timing parameter.

In a fourth aspect, the invention relates to a user equipment for use in a mobile communications network, the user equipment being configured for performing the method of the third aspect.

Further features and advantages of the present invention will be made apparent by the following detailed description of preferred embodiments thereof, provided merely by way of non-limitative example, description that will be conducted with reference to the attached drawings.

BRIEF DESCRIPTION OF THE DRAWINGS

FIGS. 3a-b-c schematically show HSDPA MBMS transmission in different operative sub-modes according to embodiments of the invention;

DETAILED DESCRIPTION OF PREFERRED EMBODIMENTS OF THE INVENTION

Figure 1:
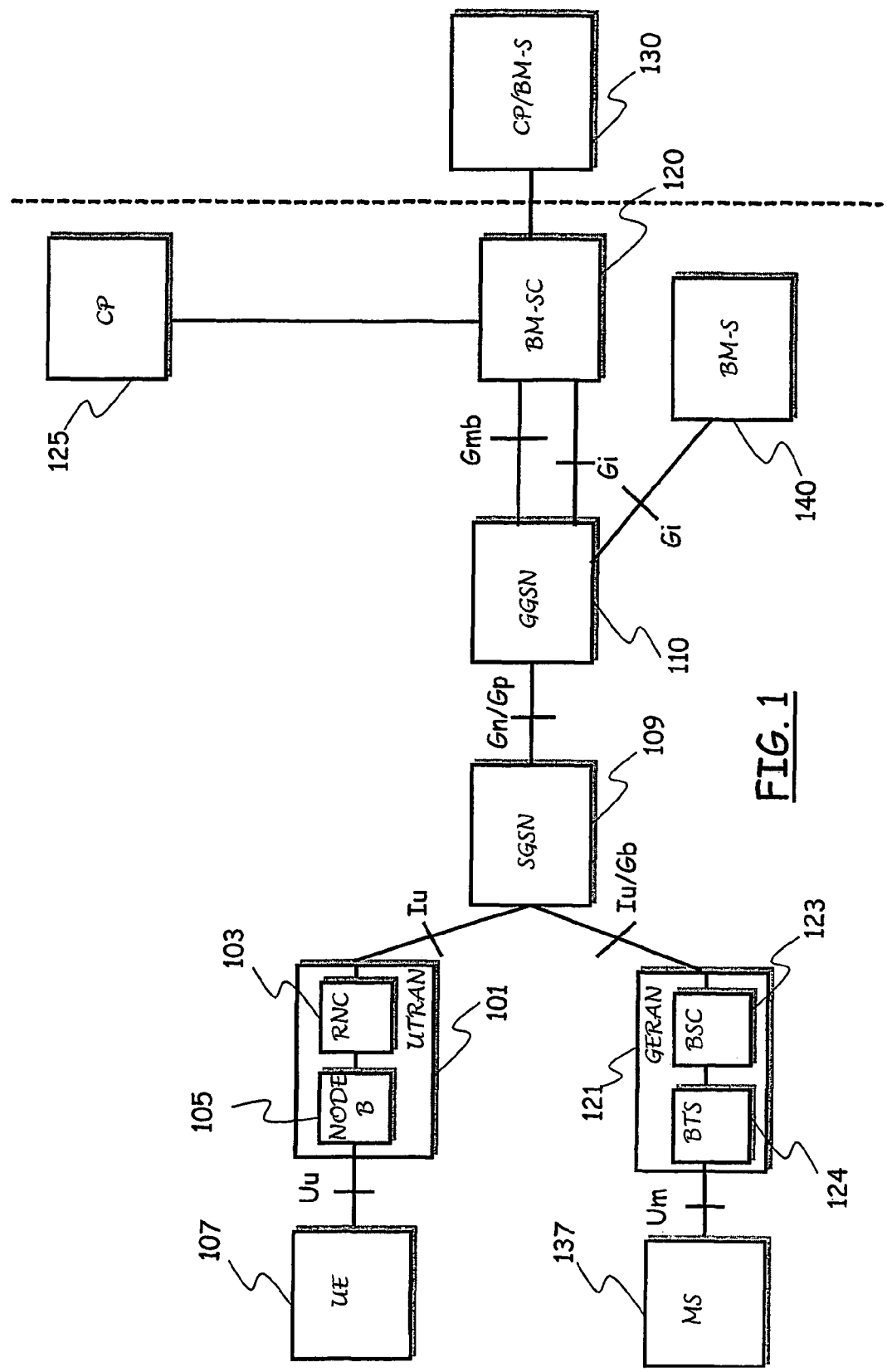
FIG. 1 schematically discloses a UMTS network adapted for MBMS transmission.

A 3G PLMN, particularly a UMTS network, as schematically shown in FIG. 1, comprises a number of logical elements, each one having a defined functionality. In the standard, network elements are defined at the logical level; however, this typically results in a similar physical implementation, since a number of open interfaces are defined in detail, so that the physical equipment at the endpoint can be provided by different manufacturers. The high-level system architecture of a UMTS network can be functionally grouped into (i) the UTRAN 101, which handles all the radio-related functionalities, and (ii) the CN (Core Network), which is responsible for switching and routing calls and data connections to external networks. The UTRAN 101 comprises in particular a RNC (Radio Network Controller) 103 controlling one or more radio transceiver station(s) or Node(s) B, like the Node B 105 in the drawing (in particular, it is assumed that the RNC 103 is the Controlling RNC—CRNC—for the Node B); each Node-B 105 is responsible for radio transmission in a predetermined area referred to as a "cell". To complete the system, UEs like the UE 107, interface with the user and the radio network interface. The UE 107 may comprise, for example, a mobile telephone equipment or a connection card to be associated to a personal computer. A UMTS Subscriber Identity Module (USIM) is typically associated to the UE 107. The mobile equipment is used as the radio terminal for radio communication, whereas the USIM is typically a smartcard that carries the subscriber identity, performs algorithms for authentication of the subscriber in the network, stores authentication and encryption keys. The design of both the UE and the UTRAN is based on the specificities of the WCDMA radio technology; on the other hand, the structure of the CN is similar to that of second generation PLMNs like GSM/GPRS/EDGE networks; in particular, in a UMTS network supporting PS data communications, the CN is enriched with network elements substantially similar to those making up a GPRS/EDGE infrastructure, particularly one or more SGSN (Serving GPRS Support Node) 109, and, possibly, one or more GGSN (Gateway GPRS Support Node) 110. HSDPA is supported by the UMTS network of FIG. 1 for transmission of high data rate content (e.g. multimedia content).

The network architecture of FIG. 1 may also encompass the existence, in addition to the UTRAN, of a GERAN (GSM EDGE Radio Access Network) 121, for servicing mobile stations such as the MS 137 in the drawing; the GERAN 121 has a structure similar to that of the UTRAN 101: however, in a GSM/GPRS/EDGE context, the functions of the RNC are performed by a network function known as with BSCs (Base Station Controllers) 123 and the equipment responsible for radio transmission in a specific cell is typically known as BTSs (Base Transceiver Stations) 124.

In FIG. 1 different interfaces, identified as Uu, Um, Iu, Gb, Gn, Gp, Gmb, Gi, between the various functional entities of the network are also identified. Such "open" interfaces allow a network operator to build a network with equipment originated from different manufacturers with reduced compatibility issues.

The UMTS network of FIG. 1 is adapted to support MBMS. The MBMS is a service in which data are transmitted from a single entity—namely a source—to multiple recipients. Transmitting the same data to multiple recipients allows network resources to be shared among different users, and thus saved. The MBMS is realized by the addition of a number of new capabilities to existing functional entities of the 3GPP architecture, and by addition of a number of new functional entities. In order to provide MBMS bearer services, some functional entities of the UMTS network, particularly the PS-domain entities such as the GGSN 110, the SGSN 107, and the RNC 103 (similarly, the BSCs 123), are enhanced to perform several MBMS-related functions and procedures, some of which are specific to MBMS. In HSDPA, the functioning of the node-B 105 may also be modified to support MBMS transmission according to the teachings of the present invention. Specific functional entities, such as a Broadcast Multicast Service Centre (BM-SC) 120, may be also provided in the UMTS network for the provisioning of the MBMS services.

More particularly, with reference to FIG. 1, the BM-SC 120 provides a set of functions for MBMS service provisioning and delivery. It may serve as an entry point for MBMS transmissions of information content provided by a source of information contents, such as a Content Provider (CP) 125 within the network. Typically, the BM-SC 120 is also used to authorize and initiate MBMS bearer services within the PLMN, and can be used to schedule and deliver MBMS transmissions. Furthermore, the BM-SC 120 can be connected, through a packet-domain network (PDN), for example the Internet, to one or more external Content Provider/Broadcast Multicast Servers (CP/BM-S), like the CP/BM-S 130, providing information contents to be transmitted via MBMS to the UEs like the UTE 107, as well as to the MSs like the MS 137, in the drawing.

The BM-SC 120 is able to provide the UEs (and/or the MSs) with the information content using MBMS delivery services, and it may schedule MBMS session transmissions, as well as label each MBMS session with an MBMS session identifier to allow the UEs/MSs distinguishing the MBMS session transmissions. Service announcements for multicast and broadcast MBMS user vices, as well as media descriptions specifying the media to be delivered as part of an MBMS user service (e.g. type of video and audio encodings), can be also provided by the BM-SC. Furthermore, the BM-SC may be able to provide the UEs/MSs with MBMS session descriptions (or MBMS service information) specifying the MBMS sessions to be delivered as part of an MBMS user service (e.g., multicast service identification, addressing, time of transmission, etc.).

The generic UE 107 supports HSDPA for the reception of high data rate transmitted information content. More particularly, the UE 107 is adapted to receive MBMS information content transmitted according to a procedure that will be explained in the following of the description. Moreover, the generic UE 107 supports functions for the activation/deactivation of the MBMS delivery service. Once a particular MBMS delivery service is activated, no further explicit user request should be required to receive MBMS data, although the user may be notified that data transfer is about to start. Also, the UE may, depending on the terminal capabilities, be able to receive MBMS delivery service announcements, paging information or support simultaneous services. For example the user can originate or receive a call or send and receive messages whilst receiving MBMS video content. Similar or identical functions are also performed by the generic MS.

The UTRAN 101 and the GERAN 121 are responsible for efficiently delivering MBMS information content (data) respectively to the UEs and to the MSs camping into a designated MBMS service area. MBMS data are transmitted in a single copy for all the mobile users that requested the service. Also, the UTRAN 101 the GERAN 121 may be able to transmit MBMS user service announcements, paging information and support other services in parallel with MBMS, for allowing users having appropriate equipment capability to originate, or receive a call, or send, or receive messages whilst receiving MBMS information content. More particularly, the UTRAN 101 (particularly the node-B 105) is adapted to transmit MBMS information content to the UE 107 using HSDPA, according to a procedure that will be explained in the following of the description.

The SGSN 109 performs user-specific MBMS delivery service control functions and provides MBMS transmissions to the UTRAN 101 (and to the GERAN 121). The SGSN 109 may also be able to generate billing data per multicast MBMS delivery service for each user. The SGSN 109 may be able to establish Iu and Gn bearers shared by many users on demand when MBMS data has to be transmitted to the users. This can be done upon notification from the GGSN 110. Likewise, when data is no longer available, the SGSN 109 may be able to tear down these Iu and Gn bearers upon notification from the GGSN 110.

The GGSN 110 serves as an entry point for data traffic, including multicast traffic, such as MBMS data. Upon notification from the BM-SC 120, the GGSN 110 may be able to request the establishment of a bearer towards the SGSN for a broadcast or multicast MBMS transmission. Further, upon notification from the BM-SC 120, the GGSN 110 may be able to tear down the established bearer. In particular, bearer establishment for multicast services is carried out towards those SGSNs 109 that have requested to receive transmissions for the specific multicast MBMS bearer service. The GGSN 110 may be able to receive multicast traffic (whether from the BM-SC 120, or from other information contents sources, such as a Broadcast/Multicast Source—BM-S—140, internal to the network) and to route this data to the proper GTP (GPRS Tunnel Protocol) tunnels set-up as part of the MBMS bearer service.

The reception of MBMS information content delivered in multicast mode is enabled by procedures exemplarily including, roughly in sequence, a subscription phase, a service announcement phase, a joining phase, a session start phase, an MBMS notification phase, a data transfer phase, a session stop phase and a leaving phase. The subscription, joining and leaving phases are performed individually for each user. The other phases are performed for an MBMS service as a whole, i.e., for all users interested in that service. The sequence of phases may be repeated, e.g. depending on the need to transfer data. Moreover, the subscription, joining, leaving, service announcement and MBMS notification phases may run in parallel to other phases, for other users that wish to benefit of the MBMS service.

In the subscription phase, the relationship between the user and the service provider is established, allowing the user to receive the related MBMS multicast service. In this phase the user agrees to receive specific MBMS service(s) offered and made available by the mobile telephony network operator. Subscription information is recorded in appropriate database(s) in the operator's network.

In the service announcement phase, MBMS user service announcement/discovery mechanisms allow users to request or be informed about the range of MBMS user services available; these services may include network operator-specific MBMS user services (provided for example by the network-internal BM-S 140) as well as services from content providers outside of the PLMN (like the content provider 130). The service announcement is used to distribute to users information about the service, parameters required for service activation (e.g. IP multicast address) and possibly other service-related parameters (e.g. service start time). Several service discovery mechanisms may be adopted, including standard mechanisms such as SMS, or, depending on the capability of the terminal, applications that encourage user interrogation.

It is observed that the service subscription and the service announcement phases are not temporally linked to each other: the service subscription phase can take place at any time before or after the service announcement phase.

In the joining phase (i.e., activation of the MBMS multicast mode reception by the user) a subscriber joins (i.e., becomes a member of) a multicast group: the user indicates to the network that he/she is willing to receive multicast-mode data related to a specific MBMS bearer service.

The session start takes place when the BM-SC 120 is ready to send data in respect to that specific MBMS service; it is observed that the session start is independent on the activation (join) of the service by the users, i.e., a generic user may activate the MBMS service either before or after the related session start. The session start triggers the establishment of the resources for MBMS data delivery.

The above mentioned service announcement may contain a schedule of session start times, and may be sent some time before the service is due to start. Thus, the period between the service announcement and the session start may amount to hours, days or even weeks. In particular, some MBMS delivery services may be 'always on': in this case, the joining phase may take place immediately after the service announcement or, possibly, many hours before, or after, the session start. In other cases, if a session start time is known, the joining may take place immediately before the session start, or thereafter. For these services, the service announcement may contain some indication of a time period within which users should choose a time to join the MBMS bearer service.

In the MBMS notification phase, the UEs are informed of the forthcoming (or already ongoing) MBMS multicast data delivery.

The data transfer is the phase in which MBMS data are transferred, i.e. delivered to the UEs. Concerning the time lapsing between the session start and the arrival of the first data, the session start indicates that the transmission is about to start; the time delay between a session start indication and the actual arrival of data should be long enough for the network actions required at session start to take place, e.g. provision of service information to the UTRAN 101, for the establishment of the radio bearers. The session start may be triggered by an explicit notification from the BM-SC 120.

The session stop takes place when the BM-SC 120 ascertains that there are no more data to send for some period of time (a period being long enough to justify removal of data delivery resources associated with the session). As a result of the session stop, the MBMS delivery resources are released.

The leaving, or MBMS multicast deactivation by the user, is the process by which a subscriber leaves (i.e., ceases being a member of) a multicast group, i.e., the user no longer wants to receive multicast mode data of a specific MBMS service.

The phases involved in the provision of a broadcast-mode MBMS are a subset of those described in connection with the multicast-mode MBMS, and include the subscription phase, the service announcement phase, the joining phase, the session start phase, the MBMS notification phase, the data transfer phase, the session stop phase and the leaving phase. The sequence of phases may be repeated, e.g. depending on the need to transfer data. It is also possible that the service announcement and MBMS notification phases may run in parallel with other phases, in order to inform UEs which have not yet received the related service.

Whenever a user wishes to enjoy an MBMS service, the user activates the service following the procedures as described above. After the service activation and the session start, the competent RNC (i.e., the RNC competent for the area in which that user is currently located, like the RNC 103 for the UE 107) sets up a RAB (Radio Access Bearer) over the radio interface, in order to support the delivery of the information contents related to the MBMS service.

In accordance with the details described in 3GPP TS 25.346 V.6.4.0, from the radio protocol point of view, the generic C-RNC which is controlling one or more network cells within an MBMS service area, like the C-RNC 103 in FIG. 1, maintains an MBMS service context for each MBMS service. Each C-RNC MBMS service context is associated with an MBMS service identifier.

The MBMS session start and session stop procedures serve to establish and release the MBMS Iu signaling connection.

In the MBMS session start and MBMS session stop phases, the RNC receives a respective request from the core network. The MBMS session start request contains the MBMS service identifier, the MBMS delivery service type and the MBMS session attributes (MBMS service area information, QoS parameters, and the like). The MBMS session start request causes the RNC to notify the UEs, which have activated the MBMS service of the MBMS session start. The MBMS session stop request may cause the RNC to notify the UEs which have activated the MBMS service of the MBMS session stop.

The MBMS session start and session stop procedures determine the setup and release of the MBMS RAB. In particular, the MBMS session start request contains all information necessary to setup an MBMS RAB. When the generic RNC receives an MBMS session start request, it typically performs an MBMS Iu data bearer set up, and, in an MBMS session start response message, it informs the core network node that sent the request about the set up outcome. When the generic RNC receives an MBMS session stop request, it releases the associated MBMS RAB resources.

The present invention makes provision of the MBMS RAB using HSDPA technology. Typically during a p-t-p HSDPA session a dedicated channel DPCH (both for the downlink and the uplink) associated to a shared downlink HS-DSCH is allocated for each HSDPA user. The scheduling algorithm in the Node B monitors the traffic volume for each single HSDPA user: for each TTI the algorithm selects a certain number of codes for the transmission towards one or more than one terminal. The mechanism for transmission on the shared HS-DSCH channel is based on the control HS-SCCH channel. According to the HSDPA standard, this channel is continuously transmitted and monitored by HSDPA terminals (by "continuously" it is intended that each terminal monitors the HS-SCCH at each TTI, or at each predetermined-number of TTI, e.g. every two TTI). In the sub-frame that anticipates the sub-frame for the packet data transmission, the Node B transmits on the HS-SCCH the following information:

- the mobile identity UE Id to which the codes are assigned for the data that will be transmitted in the next sub-frame; the mobile identity is composed of 16 bit and it is uniquely defined by the MAC in the cell and it is named HS-DSCH Radio Network Terminal Identifier (H-RNTI);
- the modulation that will be used, indicated by 1 bit (MS, Modulation Scheme, QPSK o 16-QAM);
- the number and the position of the OVSP (Orthogonal Variable Spreading Factor) codes to be demodulated, codified in the 7 bit of the CCS (Channelization Code Set) field;
- the radio block dimension (Transport Block), by means of which the channel coding scheme used is defined; the dimension of the data block is indicated by 6 bit (TBS, Transport Block Size);
- the information on the H-ARQ processes (HARQ Information, 7 bit): one bit indicates if a retransmission or a new transmission is performed, 3 bits indicate the puncturing scheme used, 3 bits indicate the configuration of the H-ARQ process to which the retransmission is referred to.

The HS-SCCH is organized in sub-frames of 3 Time Slot (corresponding to 2 ms) having the same length of the HS-DSCH sub-frames, and it uses an OVSF code with an SF (Spreading Factor) equal to 128; since each HS-SCCH can address a single user per TTI, the transmission of data to a plurality of terminals, on different groups of codes in the same TTI requires to configure in a cell a number of HS-SCCH equal to the number of users that shall be addressed in the same TTI. As already anticipated, according to the HSDPA standard the maximum number of HS-SCCH that can be configured in a cell is four on four codes of SF 128; the codes assigned to the HS-SCCH are indicated in the system information broadcast in the cell. The modulation scheme is typically QPSK.

The structure of the HS-SCCH allows to access in the first Time Slot all the information (MS e CCS) needed for the decoding of the HS-DSCH symbols in the following sub-frames; this structure allows to optimize the time relationship between the shared channels and the shared traffic channels reducing to two Time Slot (⅔ of a sub-frame) the anticipation needed between the HS-SCCH and the transmission of the corresponding HS-DSCH sub-frame.

More particularly, according to the HSDPA standard the sequence of the actions performed by the terminals is the following:

1) The UE receives the bits transmitted on the HS-SCCH and performs the decoding only of the first part of the HS-SCCH after having removed the masking with its own UE ID (first Time Slot); if there is no correspondence between the UE Id and the UE ID information, the UE understands that the information is addressed to another user.

2) If the UE ID sequence obtained with the decoding of the first part is coherent with its own UE ID, the UE uses the information on the code group and on the modulation coding scheme to access and receive data transmitted on the HS-DSCH. The time for the calculation needed for deriving the modulation scheme and the code group is equal to one Time Slot (second Time Slot).

3) In parallel to the reception of the data transmitted on the HS-DSCH sub-frame, the UE decodes the second part of the information transmitted on the HS-SCCH, in order to calculate the H-ARQ scheme used and verifies the consistency of the CRC calculated based on the two parts transmitted on the HS-SCCH;

4) After the correct verification of the CRC the UE can decode the data block on the HS-DSCH.

The codification scheme of the information and the time relationship among channels described above allow very high efficiency in the management of the time axes. Advantageously, the same scheme can be used also for MBMS transmission, particularly for the setup of a p-t-m RAB. In particular, each MBMS channel to be transmitted is associated to an identifier, the MBMS ID, which can be transmitted on a HS-SCCH channel: the field provided for the UE ID can be used for the transmission of the MBMS ID. Since a HS-SCCH set may comprise up to four parallel HS-SCCH, four different MBMS channels can be transmitted at the same time, or the same MBMS channel with four different transmission formats (in terms of modulation coding schemes), or any suitable combination thereof. The MBMS ID can be broadcast in the system information; alternatively, in a coherent way with the 3 GPP MBMS architecture, the UTRAN can transmit the MBMS ID on the MBMS Control CHannel (MCCH), as MBMS SERVICE INFORMATION and/or MBMS RADIO BEARER INFORMATION, by including the MBMS ID, the DBMS session ID if received from the core network, and p-t-m radio bearer information for the concerned MBMS service.

While the possibility of using HSDPA also for MBMS transmission allows to reach very high efficiency, the Applicant observes that the fact that the UE continuously monitors at least one HS-SCCH channel and decodes the first Time Slot of this channel in each three Time Slot sub-frame has a very high impact on the battery of the HSDPA UE, especially in case of prolonged content transmission.

In order to solve this problem, according to the present invention the UE does not continuously monitor the at least one HS-SCCH channel, and does not continuously decode the first Time Slot of this channel in each sub-frame. This operative way could be advantageously implemented for MBMS transmission. The HSDPA operation for MBMS according to the present invention will be referred to as a "HSDPA MBMS mode". When in HSDPA MBMS mode the HS-SCCH is monitored by the UE discontinuously. More particularly, at a first time the HS-SCCH channel is monitored by the UEs that have requested a particular MBMS service; on the HS-SCCH the UEs are informed of a duration of the MBMS content portion that will be transmitted on HS-DSCH starting from the next TTI. The duration of the MBMS content portion will be referred to as a "MBMS period". During a MBMS period, the UE can avoid monitoring and decoding of the HS-SCCH information. This way of working allows reducing the impact on the battery of the HSDPA terminal.

Figure 2:
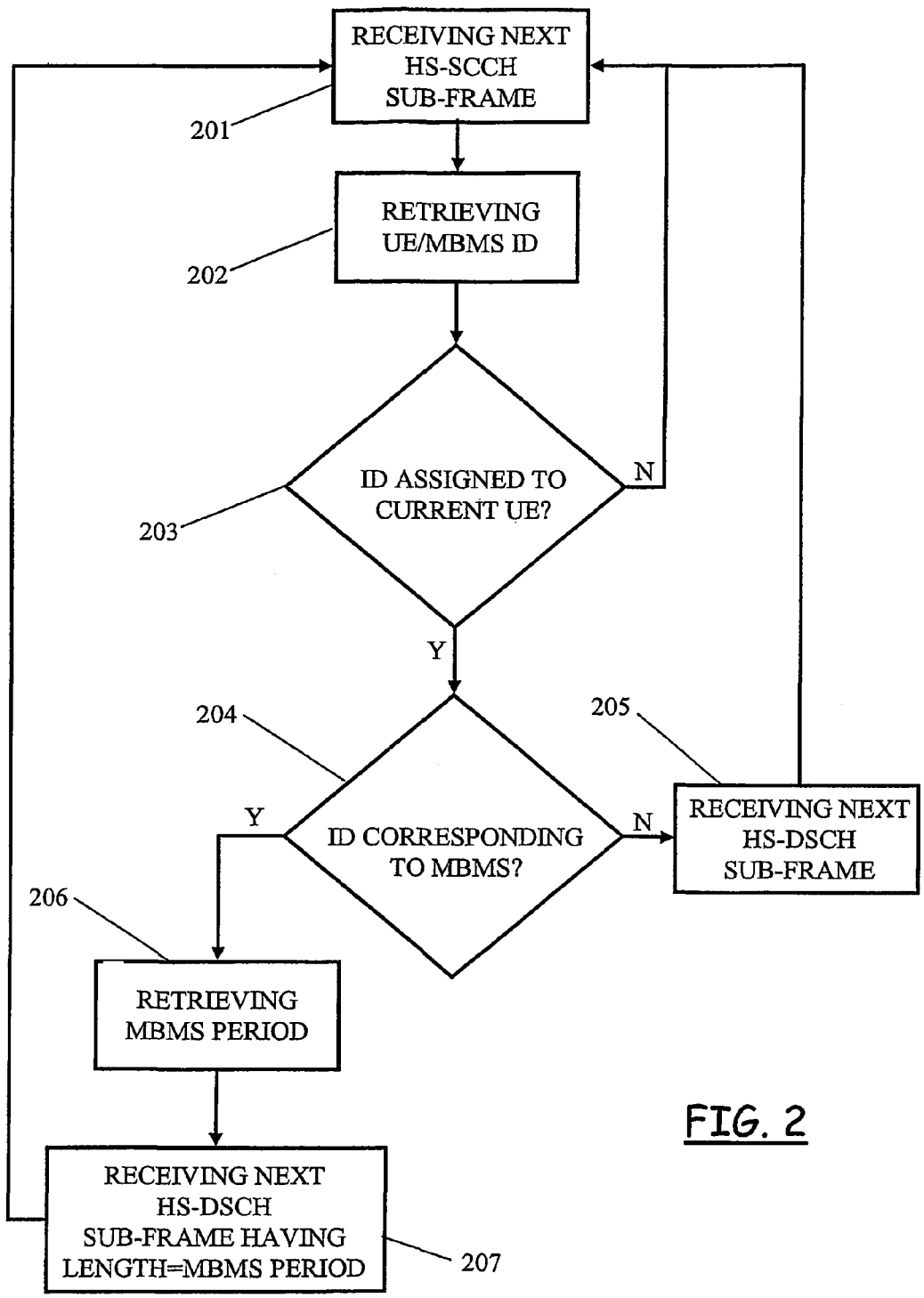
FIG. 2 shows a flow diagram with an operation of a HSDPA mobile terminal according to one embodiment of the present invention.

FIG. 2 shows a flow diagram with a possible operating mode of a HSDPA MBMS enabled UE. The UE monitors HS-SCCH and receives the next available three Time Slot sub-frame (block 201). After decoding of the ID included in the first Time Slot of the HS-SCCH sub-frame (block 202), the UE checks if the retrieved ID matches with its previously assigned UE ID and/or MBMS ID (decision block 203). In the negative case (decision block 203, exit branch "N"), the UE comes back to monitor the next HS-SCCH sub-frame (block 201). In the positive case (decision block 203, exit branch "Y"), the UE checks if the retrieved ID corresponds to an ID assigned to a MBMS channel, i.e. if the retrieved ID is a MBMS ID (decision block 204). In the negative case (decision block 204, exit branch "N"), the UE receives the next three Time Slot sub-frame on HS-DSCH (block 205), i.e. it operates according to the HSDPA standard. In the positive case (decision block 204, exit branch "Y"), the UE retrieves the MBMS period included in the HS-SCCH sub-frame (block 206), and receives information transmitted on HS-DSCH for a period length equal to the MBMS period (block 207). After having received the MBMS information portion, the UE comes back to monitor the next available HS-SCCH sub-frame (block 201), so as to restart the decoding process.

In preferred embodiments, the MBMS period is defined as a number of TTIs (or of a fixed multiple of TTIs, e.g. of two TTIs) that the UE can receive without monitoring the HS-SCCH, if it has joined the MBMS channel being transmitted. For example, the MBMS period could assume values in a time range that goes from 0 up to 30 ms with a granularity for the incremental steps of 2 ms (corresponding to one TTI), and/or from 0 up to 60 ms with a granularity of 4 ms (corresponding to 2 TTI).

In order to include the MBMS period, a proper field in the HS-SCCH information should be defined. According to preferred embodiments of the invention, the field dedicated to the inclusion of the H-ARQ information in standard p-t-p HSDPA mode may be dedicated to the inclusion of the MBMS period in HSDPA MBMS mode. According to the HSDPA standard, the H-ARQ field is composed of seven bits, one to indicate if the portion transmitted on the HS-DSCH refers to a new transmission or to a retransmission, three for the puncturing scheme used for the retransmission, the last three for the H-ARQ process to which the retransmission is referred to. In HSDPA MBMS mode, at least some of the bits of the H-ARQ field could be used for informing the UEs joining a certain MBMS channel of the MBMS period length of the next transmitted MBMS information content portion. For example, four bits could be dedicated to the inclusion of the MBMS period, defined as a number of TTIs (or of a fixed multiple of a TTI).

In case of use of the H-ARQ field for inclusion of the MBMS period, it is noticed that the significance of this field according to the HSDPA standard should be at least partially varied when operating in HSDPA MBMS mode. In particular, preferred embodiments could provide that one bit (e.g. the first) of the H-ARQ field be used for distinguishing MBMS transmission with activation of a retransmission procedure (acknowledged mode) or without activation of a retransmission procedure (non-acknowledged mode). In case of non-acknowledged HSDPA MBMS mode, the remaining bits (considering also the bits dedicated to the MBMS period) in the H-ARQ field could be used for identifying different sub-modes of operation of the HSDPA MBMS mode, each corresponding to a certain tuning of the MBMS transmission, which could be related to the radio channel conditions experienced by the UEs joining a certain MBMS service. Statistical algorithms could be implemented in the node-B in order to tune the MBMS transmission. More particularly, in preferred embodiments the MBMS HSDPA mode could be categorized in different HSDPA MBMS sub-modes, each sub-mode being identified by a predefined bit configuration of the H-ARQ field.

In the following, an exemplary and non-limiting configuration of the H-ARQ field will be described in detail. In this exemplary configuration, the first bit of the H-ARQ field is used for distinguishing between an acknowledged mode and a non-acknowledged mode of transmission. In non-acknowledged mode, four bits of the H-ARQ field are dedicated to the MBMS period, and the remaining two bits allow definition of four different HSDPA MBMS transmission sub-modes (differentiated based on the AMC scheme used). In acknowledged mode, the significance of the remaining six bits of the H-ARQ is maintained the same as in the HSDPA standard, so that a MBMS period is no longer transmitted to the UE. As it will be explained in the following, with this exemplary configuration the acknowledged mode is activated only if strictly necessary, after that the network has tried to use the non-acknowledged mode: in such case, the scheduling based on MBMS period previously communicated to the joined UEs during non-acknowledged transmission mode can be maintained by the network and used by the UEs during acknowledged transmission mode.

More in detail, the following Table 1 shows the configurations that the H-ARQ field transmitted on HS-SCCH assumes according to the present example. The expression "Std" in the last six bits of the H-ARQ field in the last row of Table 1 refers to the fact that such bits are used with their standard significance, i.e. with the significance defined in the HSDPA standard (see above).

TABLE 1

| | H-ARQ field in HS-SCCH | | | | | | |
|---|---|---|---|---|---|---|---|
| | | MBMS period | | | | AMC scheme | |
| Sub-mode 1a | 0 | — | — | — | — | 0 | 0 |
| Sub-mode 1b | 0 | — | — | — | — | 0 | 1 |
| Sub-mode 1a' | 0 | — | — | — | — | 1 | 0 |
| Sub-mode 1b' | 0 | — | — | — | — | 1 | 1 |
| Sub-mode 2a | 1 | Std | Std | Std | Std | Std | Std |

Sub-Mode 1a: Single Class MBMS AMC Mode

In this operative mode, the UTRAN associates a single HS-SCCH to the shared HS-DSCH (or, more precisely, to the associated physical shared channel HS-PDSCH), so that all the UEs which have joined the MBMS channel receive the same MBMS period in one HS-SCCH sub-frame. The modulation and coding (AMC) used for transmission of the MBMS channel (QPSK or QAM) does not change in time during an MBMS period. However, the MBMS period and/or the set of channelisation codes could be varied based on CQI feedback from the joined terminals. FIG. 3a schematically shows HSDPA MBMS transmission in this operative sub-mode. As it can be seen, transmission of a first HS-SCCH sub-frame on the control channel HS-SCCH#1 takes three Time Slots, announcing imminent transmission on HS-(P)DSCH#1 of a portion of MBMS information content having a length of nine Time Slots (i.e. a MBMS period of three TTIs, or 6 ms). Transmission on HS-(P)DSCH#1 is partially overlapped with transmission on HS-SCCH#1 (the last Time Slot of HS-SCCH#1 sub-frame is contemporary to the first Time Slot of the HS-(P)DSCH#1 sub-frame), in the same way as provided for in the HSDPA standard. During the time interval corresponding to the MBMS period, the UEs do not monitor HS-SCCH#1. After a MBMS period, a further HS-SCCH sub-frame is transmitted on HS-SCCH#1, possibly communicating to the UEs a new MBMS period, and/or modulation and coding, and/or set of channelisation codes.

Sub-Mode 1b: Multi-Class MBMS AMC Mode

In this operative mode, the UTRAN associates two HS-SCCHs to the shared HS-DSCH (or, more precisely, to the associated physical shared channel HS-PDSCH), a first HS-SCCH carrying control information related to QPSK coding, a second HS-SCCH carrying control information related to QAM coding. The UEs supporting the respective modulation/coding which have joined the MBMS channel receive the same MBMS period in one HS-SCCH sub-frame. The modulation used for transmission of the MBMS channel (QPSK or QAM) does not change in time in each HS-SCCH. However, in the following HS-SCCH sub-frame, the MBMS period, the modulation and coding, and/or the set of channelisation codes could be independently varied, for example based on CQI feedback from the joined terminals in the two HS-SCCH. This operating mode practically allows allocation of the resources exploiting the maximum capability of all the UEs. FIG. 3b schematically shows HSDPA MBMS transmission in this operative sub-mode. As it can be seen, transmission of a first HS-SCCH sub-frame on the control channels HS-SCCH#1 and HS-SCCH#2 takes three Time Slots, announcing imminent transmission on HS-(P)DSCH#1 of a portion of MBMS information content having a length of nine Time Slot (i.e. a MBMS period of three TTIs, or 6 ms) for both QPSK and QAM coding. Bandwidth in HS-(P)DSCH is split between the two AMC used. Transmission on HS-(P)DSCH#1 is partially overlapped with transmission on HS-SCCH#1 and HS-SCCH#2. During the time interval corresponding to the MBMS period, the UEs monitor neither HS-SCCH#1 nor HS-SCCH#2. After a MBMS period, a further HS-SCCH sub-frame is transmitted on HS-SCCH#1 and HS-SCCH#2, possibly communicating to the UEs a new MBMS period, and/or modulation and coding, and/or set of channelisation codes.

Sub-Mode 1a': Single-Class MBMS AMC Mode

This operative mode has characteristics identical to sub-mode 1a above, and can be used in order to inform UEs about an imminent switching to a retransmission sub-mode (2a), as it will be explained below.

Sub-Mode 1b': Multi-Class Alternating MBMS AMC Mode.

This operative mode is similar to the previous one (sub-mode 1b, Multi-class MBMA AMC mode). Two control channels HS-SCCH#1 and HS-SCCH#2 are set up by the UTRAN, in order to send control information dedicated to a respective AMC used on HS-(P)DSCH. However, in this case transmission on both HS-SCCH and HS-(P)DSCH is scheduled by alternating information transmitted in (or for controlling transmission in) QAM and information transmitted in (or for controlling transmission in) QPSK. This operative mode could be useful in case some of the UEs support an interTTI distance of two TTIs. In this case it is possible to change the modulation and coding and/or the set of channelisation codes in each MBMS period. However, the MBMS period for HS-SCCH#1 and HS-SCCH#2 should be the same. FIG. 3c schematically shows HSDPA MBMS transmission in this operative mode. As it can be seen, transmission on the control channels HS-SCCH#1 and HS-SCCH#2 is alternate, i.e. transmission of a sub-frame on HS-SCCH#1 (e.g. carrying information for decoding a portion of MBMS information content transmitted using QAM) alternates with transmission of a sub-frame on HS-SCCH#2 (e.g. carrying information for decoding a portion of MBMS information content transmitted using QPSK). Transmission on HS-(P)DSCH is also alternate, i.e. a first TTI is dedicated to transmission performed using QAM and a second TTI is dedicated to transmission performed using QPSK. The MBMS period communicated to the UEs in the case shown in FIG. 3c is two TTIs (or 4 ms).

In operation, at the setup of the MBMS RAB, as well as during content transmission, the UTRAN can collect capability information from the UEs that have joined/are joining a certain MBMS service. Such capability information could comprise, for example:

Modulation supported (QPSK or QAM)
InterTTI distance
Maximum throughput on the downlink Starting from the collected UE characteristics, an algorithm on the UTRAN can set the transmission characteristics, e.g. in terms of modulation supported, inter-TTI distance, maximum throughput on the downlink, that can be supported by all the terminals that will share the same HSDPA channel, to guarantee the access to the same MBMS channel. In other words, starting from the collected UE characteristics, the algorithm sets which HSDPA MBMS operative sub-mode should be activated in order to better serve the joined UEs.

For example, in case all the UEs support an interTTI distance of one TTI and the number of 16-QAM UEs is below a configurable threshold (e.g. set to 30% of the total number of UEs who have required a certain MBMS service) the sub-mode 1a mode could be applied, with QPSK modulation. In this case, some UE capable of 16-QAM modulation will be forced to operate in QPSK mode since they share the same resources of QPSK-only capable terminals that have subscribed the same service. On the other hand if the number of 16-QAM supporting terminals is higher than the above threshold the sub-mode 1b could be applied.

After the first MBMS period, the UTRAN may change sub-mode of operation (e.g. as a function of the number of MBMS services to be provided, and/or of the number of users for each MBMS service, and/or of the UE capabilities in terms of, for instance, interTTI distance and/or supported modulation scheme), and/or at least one of the features of the used sub-mode of operation (e.g. the MBMS period, and/or the MC, and/or the set of channelisation codes), and communicate such change in the next available HS-SCCH subframe. CQI feedback from the joined UEs, typically performed based on a scheduling of one TTI, could be used for properly setting at least some of the transmission parameters. The CQI contains the explicit indication of the transport format that allows an UE to obtain a BLER (BLock Error Ratio) of 10%. In particular, if m UEs have joined a certain MBMS channel, in one MBMS period the radio network will collect m*"MBMS period"/2 (with a TTI of 2 ms) CQI values. Statistical algorithms could be implemented at the UTRAN for managing the received CQI feedback and decide the operating mode for the HSDPA MBMS transmission. The implemented statistical algorithm should calculate a "best representative CQI" for all UEs (i.e. a CQI value representative of the overall channel quality experienced by all the UEs currently serviced), based on which the transmission characteristics used in an operative sub-mode can be set.

For example, a possible algorithm could collect and monitor, for each UE the last k CQI values, where k is a configurable threshold smaller than or equal to "MBMS period"/2. For each UE, the algorithm searches a CQI value being best representative of the radio channel quality experienced by the UE. In order to find the best representative CQI (for each UE), the algorithm selects the CQI value having the higher occurrence among the k values. The choice of the best representative CQI for each UE may further involve a second configurable threshold p, lower than k, in the following way:

1. if the CQI value having the highest occurrence among the k values has at least one occurrence in the last p values, this is the selected CQI for that particular UE;
2. if the CQI value having the highest occurrence among the k values has not at least one occurrence in the last p values, the network selects the CQI with the next highest occurrence in the observation windows of k TTIs with at least one occurrence in the last p TTIs.

Once the set containing the most representative CQI values for each UE involved in the MBMS transmission is defined, according to the above, a further algorithm allows the network to choose the best representative CQI value among those collected in the set for each UE. For example, two possibilities may be exploited:

1. the radio access network selects the CQI with the highest occurrence in the set;
2. the radio access network selects the lowest CQI in the set.

This filtering mechanism could also be activated before the first MBMS period so as to properly initialize the used MCS.

Coming back to Table 1, the sub-mode of operation 2a refers to the possibility of activating an acknowledged mode of transmission, with some similarities with the HDSPA standard. Retransmission in this HSDPA MBMS sub-mode of operation may use chase combining. On the other hand, it is noticed that IR is a mechanism that needs an adaptation on the transmission of data to a certain UE based on its feedback, which can hardly be reached with MBMS.

More particularly, the HSDPA MBMS acknowledged mode with retransmission may provide for the usage of a 1a HSDPA MBMS sub-mode that switches to a 2a HSDPA MBMS sub-mode under certain conditions. According to preferred embodiments, the UTRAN and the UEs start to operate in 1a non-acknowledged mode of operation. In this case the Modulation and Coding applied on each MBMS period is decided on the basis of the CQI fields, according to the algorithms previously described. In this case, if in an MBMS period the MC used is, for instance, the one derived by the worst CQI transmitted by all the UEs during the previous MBMS period, no retransmission is activated. On the other hand, if the above condition is not verified, then retransmission may be activated: in order to activate retransmission, the first bit of the H-ARQ bit is set to one. In order to inform the UEs that a switching to acknowledged sub-mode of operation is imminent, the UTRAN may previously switch to a 1a' sub-mode of operation, before switching to 2a sub-mode of operation. In relation to the retransmission protocol configuration applied, n simultaneous H-ARQ processes could be set up. In this operative mode the same block is retransmitted at least n times (e.g. three times), and the UE continues to maintain the MBMS period used in the 1a (or 1a') sub-mode of operation before the activation of the retransmission. In the following MBMS period the acknowledged mode could be switched to non-acknowledged 1a mode or it could continue with acknowledged 2a mode, depending on the UTRAN decision based on CQI feedback.

The invention described above allows the achievement of many advantages.

By communicating to a UE a time interval (MBMS period) during which the UE could stop monitoring of the HS-SCCH control channel a substantial reduction of the impact on the battery of the UE can be reached, particularly in case of prolonged transmission of information content to the UE. It is noticed that this result could be also applied, in principle, to p-t-p transmission, and not only for p-t-m, particularly MBMS, transmission. However, it is also noticed that a higher probability of prolonged transmission may be encountered in p-t-m, particularly MBMS, services being under consideration by the network operators, such as a mobile TV service, for example.

As disclosed above, the inclusion of the MBMS period could be implemented in HSDPA with few modifications in the current standard functioning. This allows a rapid implementation, as well as the re-use of existing technology, possibly with another significance (e.g. in the case of using the H-ARQ field for including the MBMS period, as disclosed above).

Figure 4:
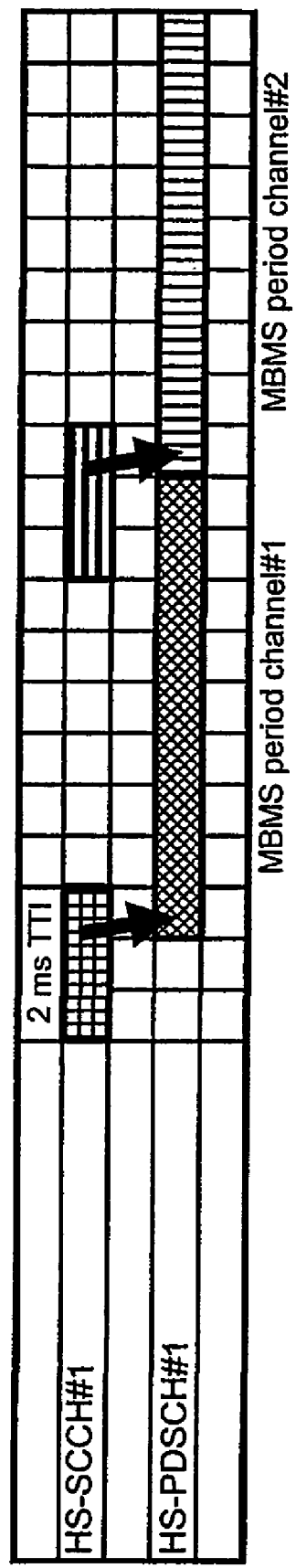
FIG. 4 schematically shows a further exemplary HSDPA MBMS transmission operative sub-mode.

Time multiplexing of different MBMS channels on the same physical resources could also be implemented. In fact, after an MBMS period the UTRAN can decide to allocate the next MBMS period to a different MBMS channel, as schematically shown in FIG. 4. This can be practically achieved by changing the MBMS identifier in the HS-SCCH MBMS ID field. This mode of operation can be applied to any of the above mentioned sub-modes of operation.

While the invention has been disclosed with particular reference to HSDPA, it is noticed that the teachings thereof could also be applied to any mobile communications system using a shared channel, particularly exploiting, as HSDPA, Adaptive Modulation and Coding (AMC), Fast Hybrid Automatic Repeat Request (H-ARQ), fast scheduling and a short period of transmission. In particular, it is believed that the teachings of the invention could be applied also for the UTRA LTE (Long Term Evolution) or 4G systems, which standards are not defined yet, but in which the above technical features should be used, in view of the requirements that such systems will have to sustain.

The invention claimed is:

1. A method of transmitting information content to at least one user of a mobile communications network, the at least one user being equipped with user equipment, comprising:
   providing at least one downlink channel for transmission of said information content;
   associating at least one control channel with said at least one downlink channel;
   transmitting first control information on said at least one control channel, said first control information being adapted to inform at least one user equipment of an availability of a portion of said information content on said downlink channel;
   transmitting second control information on said at least one control channel, said second control information comprising a timing parameter adapted to inform said at least one user equipment about a duration of at least said portion of information content; and
   transmitting said portion of information content on said at least one downlink channel,
   wherein said at least one user equipment is adapted to stop monitoring of said at least one control channel during transmission of said portion of information content on said downlink channel, and to restart monitoring of said at least one control channel at the end of said transmission of said portion of information content, based on said timing parameter.

2. The method according to claim 1, wherein said at least one user comprises a plurality of users, each of which is equipped with respective user equipment, and wherein said downlink channel is adapted for being shared among a plurality of user equipment.

3. The method according to claim 2, wherein said at least one control channel is adapted for being shared among the plurality of user equipment.

4. The method according to claim 1, wherein transmission of information content on said at least one downlink channel is scheduled according to a prefixed time interval.

5. The method according to claim 4, wherein transmission of control information on said at least one control channel is scheduled according to said prefixed time interval.

6. The method according to claim 5, wherein the transmitting of said first control information occurs during a first time interval, and said first control information is adapted to inform said at least one user equipment that the availability of said portion of information content on said at least one downlink channel will start in a second time interval, the second time interval beginning subsequent to a beginning of the first time interval.

7. The method according to claim 6, wherein said first and said second time intervals partially overlap each other.

8. The method according to claim 4, wherein said timing parameter is a multiple of said prefixed time interval.

9. The method according to claim 1, further comprising associating a content identifier with said information content.

10. The method according to claim 9, wherein said first control information further comprises said content identifier.

11. The method according to claim 9, wherein said content identifier is transmitted to said plurality of user equipment.

12. The method according to claim 10, wherein said content identifier belongs to a list of predefined content identifiers.

13. The method according to claim 12, further comprising conditioning the inclusion of said timing parameter in said second control information to the belonging of said content identifier to said list.

14. The method according to claim 1, wherein said timing parameter is in said second control information by exploiting at least a first part of predefined fields, said predefined fields being adapted to store information related to retransmission of information content portions.

15. The method according to claim 14, wherein said second control information further comprises retransmission activation information, said retransmission activation information being stored in a second part of said predefined fields, and wherein the method further comprises conditioning the inclusion of said timing parameter in said second control information to a first value of said retransmission activation information.

16. The method according to claim 1, further comprising receiving at least one feedback related to a reception quality of said downlink channel from the at least one user equipment.

17. The method according to claim 16, further comprising:
   based on said at least one feedback, setting to a second value said retransmission activation information;
   substituting said timing parameter in said second control information with information related to a retransmission of said portion of information content; and
   retransmitting at least once, said portion of information content on said at least one downlink channel.

18. The method according to claim 17, further comprising, conditioned upon said second value of said retransmission activation information:
   scheduling transmission on said at least one control channel of control information related to transmission of a further portion of information content on said downlink channel according to said timing parameter;
   setting a duration of said further portion of information content equal to said timing parameter; and
   transmitting said further portion of information content on said downlink channel.

19. A method of receiving information content at user equipment of a user of a mobile communications network, comprising:
   monitoring at least one control channel associated with a downlink channel, the downlink channel being provided for transmission of said information content, the at least one control channel being provided for transmission of control information adapted for allowing decoding of the information content transmitted on said downlink channel;

receiving first control information on said at least one control channel, said first control information being adapted to inform the user equipment of an availability of a portion of said information content on said downlink channel;

receiving second control information on said at least one control channel, said second control information comprising a timing parameter adapted to inform said user equipment about a duration of at least said portion of information content; and decoding said portion of information content on said at least one downlink channel, by accessing said downlink channel based on said first control information for a duration equal to said timing parameter; and stopping monitoring of said at least one control channel during transmission of said portion of information content on said downlink channel, and restarting monitoring of said at least one control channel at the end of said transmission of said portion of information content, based on said timing parameter.

20. The method according to claim 19, wherein said second control information further comprises retransmission activation information and further comprises, conditioned upon a value of said retransmission activation information:

receiving on said at least one control channel control information related to transmission of a further portion of information content on said downlink channel, the transmission being scheduled according to said timing parameter; and receiving said further portion of information content on said downlink channel for a duration equal to said timing parameter.

21. A mobile communications network comprising an access network sub-system comprising equipment being configured for performing the method of claim 1.

22. A user equipment for a mobile communications network, comprising a configuration adapted to perform the method of claim 19.

* * * * *